United States Patent [19]

Revells

[11] 4,119,427
[45] Oct. 10, 1978

[54] HYDRAULIC SYSTEM FOR GLASS BENDING APPARATUS WITH PRESSURE RELEASE ASSEMBLY

[75] Inventor: Robert G. Revells, Toledo, Ohio

[73] Assignee: Libbey-Owens-Ford Company, Toledo, Ohio

[21] Appl. No.: 864,426

[22] Filed: Dec. 27, 1977

[51] Int. Cl.$^2$ ............................................. C03B 23/02
[52] U.S. Cl. ..................................... 65/159; 65/160; 65/273; 65/287
[58] Field of Search ................. 65/159, 273, 275, 160, 65/287, 289

[56] References Cited

U.S. PATENT DOCUMENTS

| | | | |
|---|---|---|---|
| 805,066 | 11/1905 | Hitchcock | 65/159 |
| 1,574,903 | 3/1926 | Kucera | 65/159 |
| 2,192,302 | 3/1940 | Errett | 65/159 |
| 2,790,425 | 4/1957 | Norris | 65/159 X |
| 3,607,194 | 9/1971 | Ayers | 65/275 X |
| 3,905,794 | 9/1975 | Revells et al. | 65/273 X |

Primary Examiner—Arthur D. Kellogg
Attorney, Agent, or Firm—Collins, Oberlin & Darr

[57] ABSTRACT

A press actuating hydraulic system for a glass bending apparatus including a pressure release valve assembly operable to assure press member retraction in the event of a pressure failure in the main pressure supply conduit controlling actuation of the press member.

12 Claims, 3 Drawing Figures

HYDRAULIC SYSTEM FOR GLASS BENDING APPARATUS WITH PRESSURE RELEASE ASSEMBLY

BACKGROUND OF THE INVENTION

This invention relates generally to the glass bending art and, more particularly, to press bending apparatus incorporating a novel hydraulic pressure release system for the press member actuator.

Bent glass sheets have become increasingly popular for use as glazing closures, particularly in sight openings for vehicles such as automobiles and the like. For such purposes, the glass sheets must be bent to precisely defined curvature dictated by the configuration and size of the openings in the overall design of the vehicle.

Generally, curved glass sheets intended for use in automobiles are tempered to increase their resistance to damage due to impact and to improve the breaking characteristics of the glass when broken so as to fragment into relatively small harmless particles as opposed to the large, jagged pieces resulting from the breakage of ordinary untempered glass.

One common method of producing curved, tempered sheets of glass is to heat flat sheets of glass to their softening temperature, press the softened sheets to the desired curvature between complemental shaping surfaces and then rapidly chill the bent sheets in a controlled manner to a temperature below the annealing range of glass. Generally, these operations are carried out successively while the sheets of glass are being advanced substantially continuously on a conveyor system along a horizontal path including a heating area, a bending area and a chilling or tempering area whereby the heat initially imparted to each sheet to bring it to the proper bending temperatue can also be utilized in the final heat treating or tempering operation.

The above referred to complemental shaping surfaces are formed on opposed upper and lower press members normally located above and below the horizontal path of movement of the glass sheets to receive the latter therebetween and are movable relatively toward and away from each other for pressing the sheets into the desired shape. Generally, an hydraulic actuator is employed for raising the lower press member upwardly to engage and lift a heated glass sheet off the conveyor system out of such horizontal path and press the same against the shaping surface of the opposed or upper press member.

In order to preclude glass sheet jam-up in the heating area, or anywhere along the conveyor system upstream of the press area in the event of hydraulic pressure failure when the lower press member is in an upper, extended position in the path of movement of oncoming sheets, a pressure relief valve is incorporated in the hydraulic system to dump or unload the pressure in the press actuator and allow the lower press member to descend into its lower, out-of-the-way position. However, these prior known pressure relief valves have not been entirely satisfactory. The ones applicant is familiar with commonly utilize spool valves and, because of infrequent usage and the close sliding tolerances imposed thereon, hydraulic fluid and other foreign matter that accumulates between the spool valve and its bore produces a "varnish" condition, causing the spool valve to stick when actuated and thereby abort its fail-safe function.

SUMMARY OF THE INVENTION

Accordingly, it is a primary object of the present invention to provide a press actuating hydraulic system having an improved pressure release system which obviates the above deficiencies.

It is another object of this invention to provide a new and improved pressure evacuation system for assuring retraction of a press member upon pressure failure in the hydraulic system controlling press actuation.

It is a further object of the present invention to provide a new and useful positive acting pressure dump valve assuring press member retraction upon system pressure failure.

The foregoing and other objects, advantages, and characterizing features of the present invention will become clearly apparent from the ensuing detailed description of an illustrative embodiment thereof, taken together with the accompanying drawings, wherein like reference numerals denote like parts throughout the various views.

DESCRIPTION OF THE PREFERRED EMBODIMENT

Figure 1:
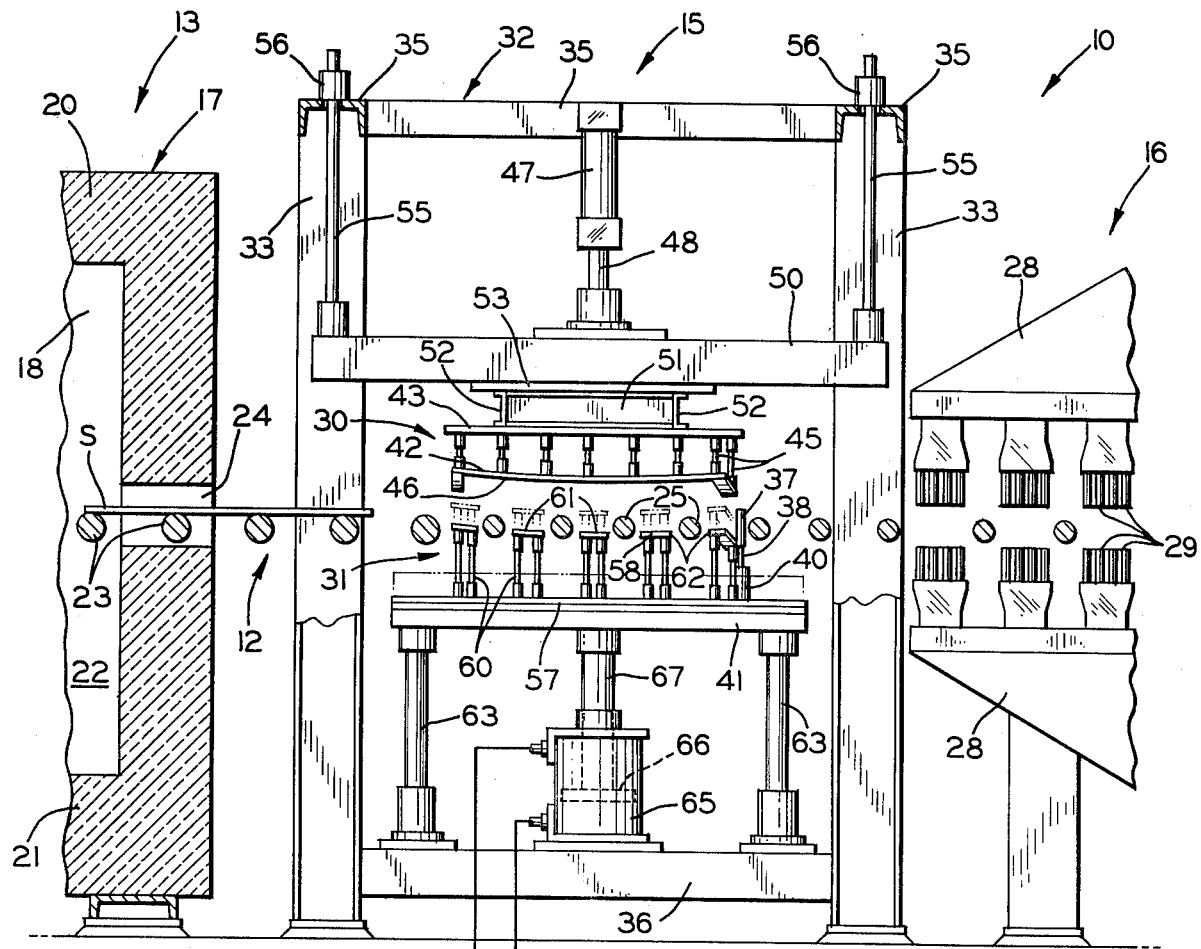
FIG. 1 is a side elevational view of a bending and tempering apparatus embodying and diagrammatically showing the novel features of the present invention.

Referring now in detail to the illustrative embodiment depicted in the accompanying drawings, there is shown in FIG. 1 a bending and tempering apparatus, comprehensively designated 10, for producing bent tempered glass sheets by a continuous process in which the sheets to be treated are moved successively along a predetermined path through a heating area, a bending area and a tempering area, these areas being contiguous so that a sheet passes immediately from one area to the next succeeding area. To this end, apparatus 10 includes a conveyor system 12 adapted to support a plurality of sheets S in a horizontal plane for movement, one by one, along a predetermined horizontal path through a heating section 13, a bending section 15, and a tempering section 16, the sections 13, 15 and 16 being disposed end-to-end along said path.

In the illustrated embodiment, the heating section 13 comprises a tunnel-type furnace 17 having a heating chamber 18 defined by a top wall 20, a bottom wall 21, and opposite side walls 22, all formed of a suitable refractory material. The chamber 18 can be heated in any desired manner by suitable heating means, such as gas fired burners or electrical resistance elements for example (not shown) located in the top and side wals of the furnace 17. The sheets S are advanced through the heating chamber 18 on a series of conveyor rolls 23, which form a part of the conveyor system 12, and extend from the entrance end (not shown) of the furnace 17 to an oppositely disposed exit end. The sheets S are heatd to substantially the softening point of the glass during their passage through the chamber 18 and, upon emerging from an opening 24 in the exit end of the furnace, are received on a second series of conveyor rolls 25, also a part of the conveyor system 12, which move the sheets into and within the bending section 15 between a pair of press members, hereinafter identified and more fully described, for imparting the desired curvature to the sheets S. The actuation of the lower press member is controlled by an hydraulic fluid pressure system 26 embodying the novel pressure release system and dump valve assembly 27 of this invention.

After bending, the sheet S are advanced along the path on conveyor rolls 25, which move the bent sheet S to and through tempering section 16 wherein their temperature is rapidly reduced to produce the proper temper in the glass. In the illustrative embodiment, the tempering section 16 includes cooling means comprising upper and lower blastheads 28 disposed above and below the path of movement of the glass sheets and are provided with a series of tubes 29 operable to direct opposed streams of cooling fluid, such as air or the like, toward and against the opposite surfaces of the sheets S moving along such path.

In accordance with this invention, the bending apparatus 10 comprises an upper male press member 30 and a lower female press member 31 having opposed complemental shaping surfaces conforming to the desired curvature of the sheet to be bent. The press members 30 and 31 are mounted for relative movement toward and away from each other on a structural frame 32, which includes a framework of vertically disposed columns 33 and horizontally extending beams 35 interconnected and tied together to form a rigid, box-like structure. A base member 36 extends between the upright columns 33 for supporting the female press member 31 and associated parts. The male press member 30 is mounted above the conveyor rolls 25 for vertical reciprocal movement relative to frame 32 while the female press member 31 is located below the conveyor rolls 25 and mounted for vertical reciprocal movement toward and away from male press member 30.

A pair of laterally spaced locator stops 37 (only one of which is shown in FIG. 1) is positioned in the path of movement of the advancing glass sheets to interrupt movement thereof and acurrately position the same in the desired location relative to the press members 30 and 31. Each stop 37 is secured to the distal end of a piston rod 38 of a fluid actuating cylinder 40 mounted on a carriage 41. The cylinders 40 are operative to raise and lower the stops 37 between an upper position above conveyor rolls 25 in the path of movement of the glass sheet S and a lower position therebeneath.

The male press member 30 is of outline or ring-type construction and comprises a continuous shaping rail 42 connected to a base member 43 by a plurality of connecting rod members 45. The shaping rail 42 conforms in outline to the glass sheets S to be bent and is provided with a downwardly directed, generally convex shaping surface 46 on the lower surface thereof to impart the desired curvature to the sheet. However, the particular outline of the shaping rail 42, as well as the specific curvature of the shaping surface 46, is dictated by the desired shape o the glass sheet being bent and can vary widely, as desired.

The means for supporting the male press member 30 on frame 32 includes at least one actuating cylinder 47 mounted on one of the upper horizontal beams 35 and having a suitable reciprocable piston (not shown) provided with a piston rod 48 connected at its outer end to a vertically reciprocal platen frame 50. The base member 43 of the male press member 30 is connected to the platen frame 50 for movement therewith by means of interconnected structural members 51 and 52 and a support plate 53 extending transversely of the platen frame 50. A plurality of guideposts 55 are connected at their lower ends to the four corners of platen frame 50, respectively, and extend upwardly through suitable bushing 56 mounted on upper horizontal beams 35 for sliding movement relative thereto to properly guide platen frame 50 during the its vertical reciprocal movement.

The female press member 31 also is of outline or ring-type construction and comprises a base member 57 secured to the carriage 41 and a shaping rail 58 connected to the base member 57 in spaced relation thereto via a series of connecting rod members 60. The shaping rail 58 conforms in outline to the glass sheets S to be bent and is provided on its upper face with a generally concave shaping surface 61 complementary to the male press member shaping surface 46 in opposed relation thereto. To permit displacement of the female shaping rail 58 above the level of the conveyor rolls 25 for lifting the glass sheets thereabove into pressing engagement with the male shaping surface 46, the female rail 58 is formed of a plurality of segments 62 spaced apart from each other a sufficient distance to pass between adjacent rolls 25. As compared to rolls 23, the diameters of rolls 25 are formed relatively small to provide maximum clearance therebetween for the passage of the segments 62 therethrough.

The carriage 41 is supported by a pair of guide members 63 and is vertically movable by a fluid cylinder 65 mounted on base member 36 and provided with a suitable reciprocal piston 66 having a piston rod 67 attached at its upper end to carriage 41. The cylinder 65 is operative to raise and lower the female press member 31 between its lower position beneath conveyor rolls 25 and its upper position thereabove for lifting a heated glass sheet S from the conveyor rolls 25 and pressing the same against the male press member 30 between the complementary shaping surfaces 46 and 61, thus forming the glass sheet to the desired curvature. After bending, piston rod 67 is retracted to lower the female press member 31 below conveyor rolls 25, depositing the bend sheet thereon for advancement into the tempering section 16.

In a typical operational cycle, glass sheets S are loaded one at a time onto the conveyor rolls 23 at the entrance end (not shown) of the furnace 17 for movement through the heating chamber 18 wherein each sheet S is heated to substantially its softening point or bending temperature. The heated sheet S passes through the opening 24 and is transferred onto conveyor rolls 25 for movement into bending section 15. As the sheet enters the bending section 15, a photocell or other suitable detection device (not shown) initiates activation of a timer (also not shown) controlling operation of the bending cycle. The timing of this control is such that when the leading edge of the glass sheet S engages the stops 37, cylinder 65 is actuated to raise the female press member 31 upwardly to remove the sheet from conveyor rolls 25 and press the same against the shaping surface 61 of the male press member 30. During the upstroke of female press member 31, cylinders 40 are actuated to retract the locator stops 37 to permit advancement of the bent sheet when subsequently returned to the conveyor rolls 25.

After the glass sheet has been shaped between the press members 30 and 31 to impart the desired curvature thereto, the female press member 31 is lowered, as by means of cylinder 65, below conveyor rolls 25 to deposit the bent sheet thereon for advancement out of the bending section 15 and into the tempering section 16. The bent sheet is advanced by conveyor rolls 25 into and through the tempering section 16 between the opposed tubes 29 of blastheads 28 at a speed promoting a proper rate of cooling to attain the desired temper in the bend sheet.

As shown diagrammatically in FIG. 1, the hydraulic system 26 for controlling operation of cylinder 65 includes an electrically operated pump 70 connected to a suitable source of hydraulic fluid (not shown) for delivering fluid under pressure to a main line pressure supply conduit 71 having a check valve 72 therein to permit flow in one direction and prevent flow in the opposite direction. An accumulator 73 also is provided in main line pressure supply conduit 71 to dampen surges and assure constant pressure within the system. Main line pressure supply conduit 71 is connected to a directional control valve 75 having outlets connected to the upper and lower sides of cylinder 65 above and below the piston 66 therein by means of conduits 76 and 77 and an exhaust outlet connected to the reservoir or tanks 78 by conduit 80. Control valve 75 is of the four-way, three-position directional type provided with a spool valve (not shown), the position of which is controlled by solenoids 81 and 82. A conduit 83 is tapped into conduit 77, connecting the lower end of cylinder 65 below piston 66 to a normally closed shut-off valve assembly 85 forming a part of the pressure release system and dump valve assembly 27 of this invention, as will presently be described.

Also tapped into main line pressure supply conduit 71 is a conduit 86 leading to one side of a ball valve control cylinder 87, as will also hereinafter be more fully described. The conduit 86 passes through a pressure discharge valve, generally designated 88, shown diagrammatically in dashed outline in FIG. 1 and which includes a check valve 89 and a poppet-type, pressure differential, control valve 90. The check valve 89 is located in line 86 to provide flow in the direction toward cylinder 87 and prevent flow in the opposite direction. The opposite ends of control valve 90 are tapped into conduit 86 on opposite sides of check valve 89 by conduits 91 and 92. Control valve 90 has an inlet connected via line 93 to conduit 86 downstream of check valve 89 and an exhaust outlet connected via line 95 to tank for exhausting fluid under pressure. As long as the pressure remains equal on opposite sides of check valve 89, the equalized pressure reflected in conduits 91 and 92 will maintain the control poppet valve 90 in a neutral position blocking off line 93 from line 95.

Figure 2:
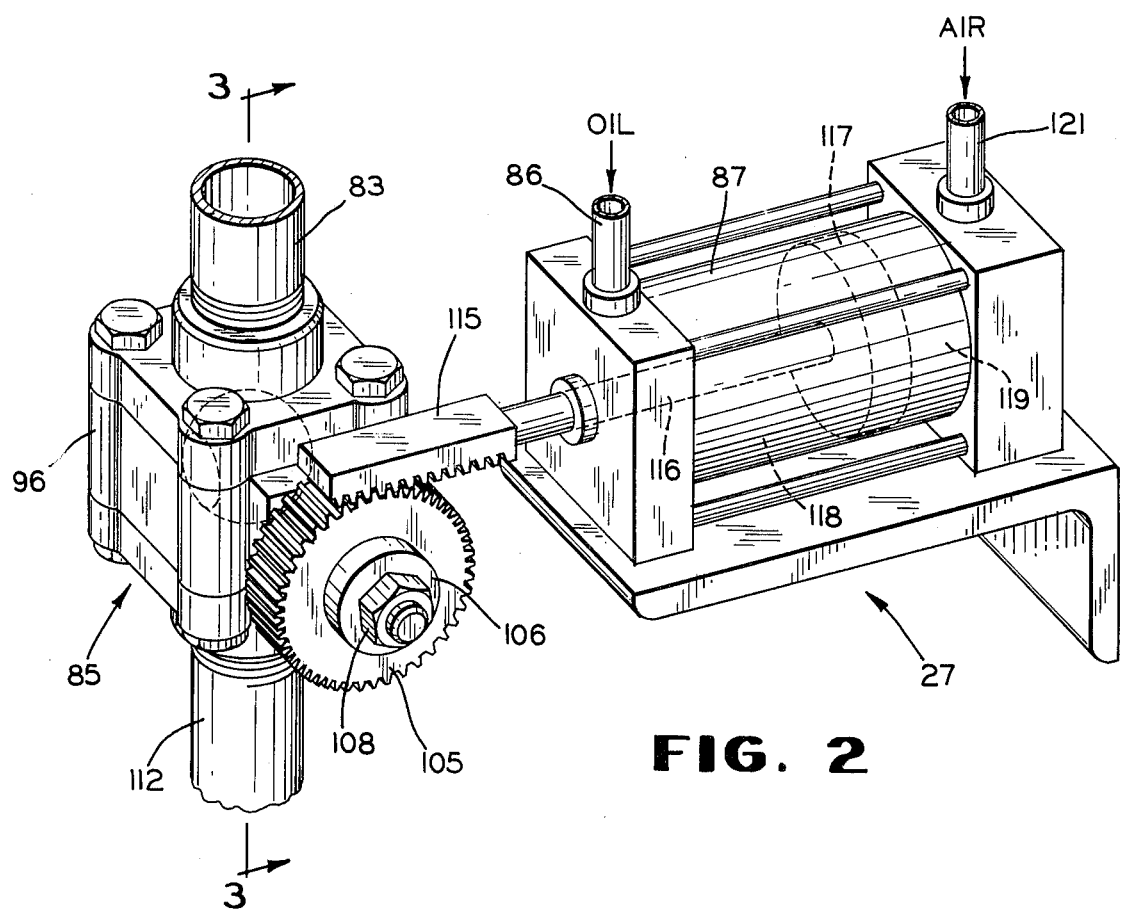
FIG. 2 is a perspective view of a pressure dump valve assembly constructed in accordance with the present invention.
Figure 3:
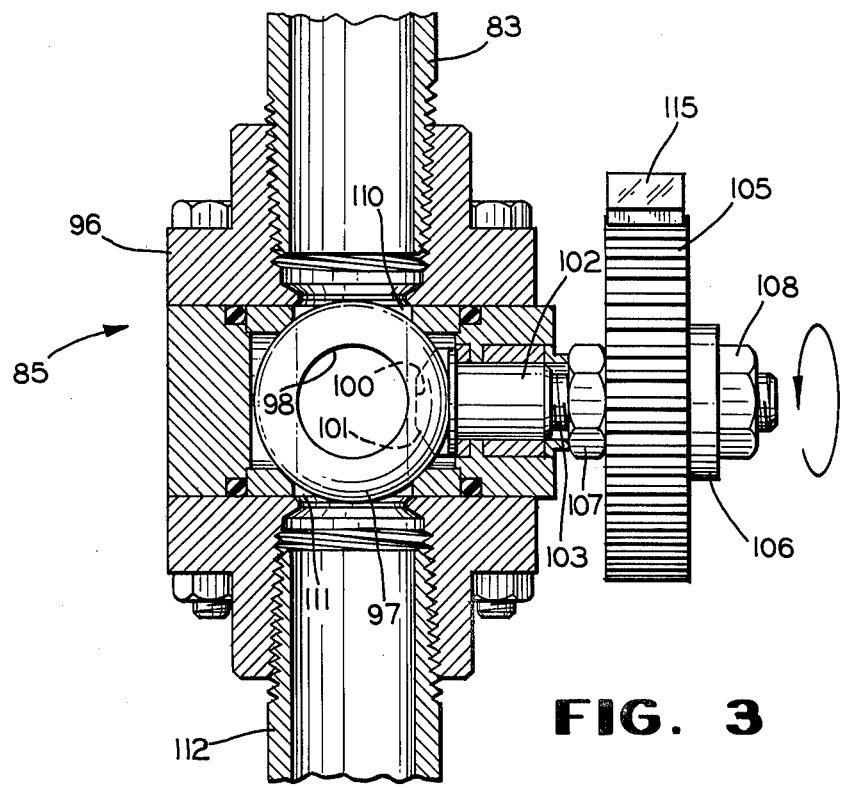
FIG. 3 is a vertical sectional view, on an enlarged scale, taken along the line 3—3 of FIG. 2.

Referring now to FIGS. 2 and 3, the shut-off valve assembly 85 includes a housing 96 having a ball valve 97 journalled therein and provided with a bore 98 therethrough. A slot or groove 100 is formed in a peripheral surface of ball valve 97 for receiving the complementary shaped head 101 of a stem 102 extending through the housing 96 and having a threaded stem portion 103 projecting outwardly therefrom. A pinion gear 105 is mounted on stem portion 103 for rotary movement therewith and is held in place thereon by a washer 106 and a pair of lock nuts 107 and 108 threaded on stem portion 103 against one face of gear 105 and the washer 106 to clamp the gear 105 therebetween.

The valve housing 96 is formed with a port 110 connected to the conduit 83 which is in communication with the lower side of cylinder 65 piston 66 by means of conduit 77. A diametrically opposed port 111 is formed in the housing 96 and is connected to exhaust or tank 78 by means of a conduit 112. In the normal shut-off position of ball valve 97 as shown in FIG. 3, these two ports 110 and 111 are blocked off from each other. When rotated 90°, the bore 98 of ball valve 97 becomes aligned with ports 110 and 111 to establish communication therebetween.

The pinion gear 105 engages and meshes with a gear rack 115 secured to the distal end of a piston rod 116 connected at its inner end to a reciprocal piston 117 provided in cylinder 87. Piston 117 divides the cylinder 87 into two compartments or chambers 118 and 119. Compartment 118 at the rod end of cylinder 87 is connected to conduit 86 normally reflecting the hydraulic pressure in main line pressure supply conduit 71 while compartment 119 at the head end of cylinder 87 is connected to a source 120 of air under pressure by means of a conduit 121. The pressure differential established by the pressurized fluid and pressurized air on opposite sides of piston 117 maintain the latter and thereby gear rack 115 retracted to keep the ball valve 97 in a closed position. Evacuation of hydraulic pressure in compartment 118 causes the air under pressure in compartment 119 at the head end of cylinder 87 to move the piston 117 leftwardly, as viewed in FIG. 2, and extend the gear rack 115. Extension of gear rack 115 rotates pinion gear 105 and the attached stem 102 to rotate ball valve 97 and bring bore 98 into registry with ports 110 and 111 estabilshibg communication therebetween.

In the event of a pressure failure in main line pressure supply conduit 71, as might be caused by an electrical power failure disrupting operation of the pump 70 for example, while the lower press member 31 is in an upper extended position, the pressurized fluid trapped below piston 66 would maintain the press member 31 in such an extended position. If this condition were not immediately noticed by an attendant and corrected in a continuous, mass production operation, the leading oncoming glass sheet would engage the press member 31 or its supporting structure and succeeding sheets being advanced on the continuous conveyor system 13 would jam on the conveyor 12 and in the furnace. The glass sheets accumulating in the furnace would overheat to highly viscous conditions and damage the underlying supporting conveyor rolls 25 and possibly other furnace components. Conveyor roll replacement, with consequent furnace cool down and shut down, would seriouly impair production.

The fail-safe pressure release system of the present invention embodied in the press member hydraulic system 26 avoids these shortcomings by assuring press member retraction in the event of main line pressure failure. Thus, upon failure of pressure in main supply conduit 71 and thereby conduit 86, check valve 89 closes to create a pressure differential via conduits 91 and 92 at the opposite ends of control valve 90. This causes the valve 90 to shift establishing communication between lines 93 and 95 to exhaust the pressurized fluid from the rod end of cylinder 87 to tank 78 via conduit 86, line 93, valve 90, and line 95. The air pressure bias on piston 117 then moves the same to extend gear rack 115 and rotate gear 105 and thereby ball valve 97 ninety degrees to establish communication between ports 110 and 111 via valve bore 98. Fluid under pressure piston 66 in cylinder 65 is thereby exhausted via conduit 77, conduit 83, port 110, ball valve bore 98, port 111 and conduit 112 to tank 78, allowing the weighted carriage 41 along with the pressure member 31 to descend to its lower position beneath conveyor rolls 25 and out of the horizontal path of advancing glass sheets S.

It should be understood that the pressure release system described above preferably is intended to become operative upon complete pressure failure in main pressure supply conduit 71 or at least a substantial pressure reduction therein to avoid exhausting the hydraulic pressure in cylinder 65 below piston 66 upon slight pressure reductions in main supply conduit 71 such as commonly occur under normal operating conditions. To this end, the poppet valve of control valve 90 can be designed to be shifted at pressure ratios of 1 to 2 for example, i. e. when the pressure upstream of check vlave 89 falls below 1/2 the pressure downstream thereof. This pressure differential or ratio is illustrative only and should not be taken as limiting the scope of this invention, but can vary widely, as desired.

From the foregoing, it is apparent that the objects of the present invention have been fully accomplished. As a result of this invention, an improved hydraulic system for press member actuation is provided and includes a novel failsafe pressure release system for assuring press member retraction in the event of hydraulic main line pressure failure. A novel dump valve assembly is provided and becomes automatically operable in response a hydraulic pressure failure in the main pressure line supply conduit to assure positive press member retraction. While the invention has been described in connection with a glass bending apparatus comprising a pair of complementary shaped press members, it should be appreciated that the hydraulic pressure dump or unloading system of the invention also has utility in inertia-gravity type glass bending molds, or in any application where it is important to assure positive retraction of an hydraulic actuator.

It is to be understood that the form of the invention herewith shown and described is to be taken as an illustrative embodiment only of the same, and that various changes in the shape, size and arrangement of parts may be resorted to without departing from the spirit of the invention.

I claim:

1. In combination, a reciprocable bending member for shaping a glass sheet, an hydraulic actuator for reciprocating said bending member, and a fluid pressure release means for exhausting fluid under pressure trapped in said hydraulic actuator including a housing having a fluid inlet connected to said fluid under pressure in said actuator and a fluid outlet connected to exhaust, a normally closed valve means in said housing for controlling the flow of said fluid under pressure from said fluid inlet to said fluid outlet, means for actuating said valve means to establish communication between said fluid inlet and said fluid outlet, a control cylinder having a movable member therein defining a chamber on one side of said movable member in said cylinder, said actuating means operatively connected to said movable member, said chamber being connected to and reflecting the hydraulic pressure in a main line pressure supply conduit, said movable member being responsive to a substantial pressure reduction in said chamber as a result of a pressure failure in said main line supply conduit to initiate operation of said actuating means and effect evacuation of said fluid under pressure from said actuator.

2. The combination of claim 1, wherein said movable member also defines a second chamber on the other side thereof in said cylinder, said second chamber connected to an air pressure source to provide a bias for urging said movable member in one direction upon a substantial pressure reduction in said first mentioned chamber.

3. The combination of claim 1, wherein said actuating means comprises a rotatable stem connected at its inner end to said valve means in said housing and having an outer end projecting outwardly from said housing, a gear rigidly secured to the outer end of said stem, and an elongated gear rack engageable with said gear and connected to said movable member.

4. The combination of claim 1, including a discharge valve means connected to said main line pressure supply conduit for facilitating the evacuation of fluid under pressure from said chamber upon a substantial pressure reduction in said main line pressure supply conduit.

5. The combination of claim 4, wherein said discharge valve means includes a check valve means interposed between said main line pressure supply conduit and said chamber, said conduit charging said chamber with fluid at main line supply pressure, and a valve means responsive to a substantial pressure differential on opposite sides of said check valve means for connecting said chamber to exhaust whereby a substantial pressure drop in said main line pressure supply conduit actuates said valve means to evacuate said chamber.

6. Apparatus for bending glass comprising: a bending member, an hydraulic cylinder having a piston operatively connected to said bending member for extending and retracting the same, an hydraulic system comprising a reservoir, a cylinder having a movable piston therein, a conduit means supplying fluid under pressure to said cylinder for extending said piston, check valve means in said conduit means permitting flow toward said cylinder and preventing flow in the opposite direction, normally closed valve means operable to connect said conduit means downstream of said check valve means to said reservoir, and means responsive to a substantial pressure reduction in said conduit means upstream of said check valve means for opening said normally closed valve means to establish communication between aid conduit means downstream of said check valve means and said reservoir and exhaust fluid under pressure from said cylinder allowing said piston to retract.

7. Apparatus according to claim 6, whereins said pressure responsive means comprises a control cylinder having a movable member therein defining a chamber on one side of said movable member in said control cylinder, said chamber being connected to and reflecting the hydraulic pressure in said conduit means upstream of said check valve means, said movable member being responsive to a substantial pressure reduction in said chamber as a result of pressure failure in said conduit means upstream of said check valve means for effecting opening of said normally closed valve means.

8. Apparatus according to claim 7, including means for actuating said normally closed valve means, and means connecting said actuating means to said movable member.

9. Apparatus according to claim 8, wherein said actuating means comprises a gear operatively connected to said normally closed valve means and a gear rack engageable with said gear and operatively connected to said movable member.

10. Apparatus according to claim 6, including a pressure discharge valve means connected to said conduit means upstream of said check valve means for facilitating operation of said pressure responsive means.

11. Apparatus according to claim 7, including a pressure discharge valve mans connected to said conduit means upstream of said check valve means for facilitating the evacuation of fluid under pressure from said chamber upon a substantial pressure reduction in said conduit means upstream of said check valve means.

12. Apparatus according to claim 7, including a second chamber on the other side of said movable member in said control cylinder, said second chamber connected to an air pressure source to provide a bias for urging said movable member in one direction upon a substantial pressure drop in said first mentioned chamber.

* * * * *

UNITED STATES PATENT AND TRADEMARK OFFICE
CERTIFICATE OF CORRECTION

PATENT NO. : 4,119,427

DATED : October 10, 1978

INVENTOR(S) : Robert G. Revells

It is certified that error appears in the above-identified patent and that said Letters Patent are hereby corrected as shown below:

Col. 1, line 15, "curvature" should be --curvatures--

Col. 2, line 58, "wals" should be --walls--; line 64, "heatd" should be --heated--

Col. 3, line 8, "sheet" should be --sheets--; line 9, "sheet" should be --sheets--; line 41, "acurrately" should be --accurately--; line 59, "c" should be --of--

Col. 4, line 6, "bushing" should be --bushings--; line 8, cancel "the"; line 43, "bend" should be --bent--

Col. 5, line 8, "bend" should be --bent--; line 48, after "tank" insert --78--; line 68, after "65" insert --below--

Col. 6, lines 29 and 30, "establishibg" should be --establishing--; line 42, "13" should be --12--; lines 48 and 49, "seriouly" should be --seriously--; line 65, after "pressure" insert --below--

Col. 7, line 1, "pressure" should be --press--; line 15, "vlave" should be --valve--; line 26, "a" should be --to--

Col. 8, line 41, "aid" should be --said--; line 45, "whereins" should be --wherein--

Signed and Sealed this

Twenty-seventh Day of March 1979

[SEAL]

Attest:

RUTH C. MASON
Attesting Officer

DONALD W. BANNER
Commissioner of Patents and Trademarks